(No Model.) 2 Sheets—Sheet 1.

J. T. BRIGHT.
COB PIPE TURNING AND BORING LATHE.

No. 427,037. Patented May 6, 1890.

Witnesses

Inventor
Joseph T. Bright (No Model.) 2 Sheets—Sheet 2.
J. T. BRIGHT.
COB PIPE TURNING AND BORING LATHE.
No. 427,037. Patented May 6, 1890.
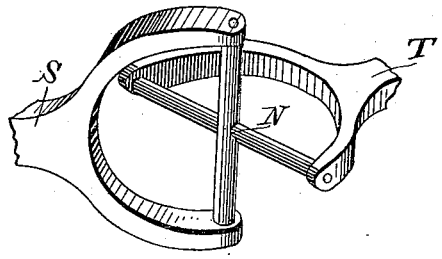
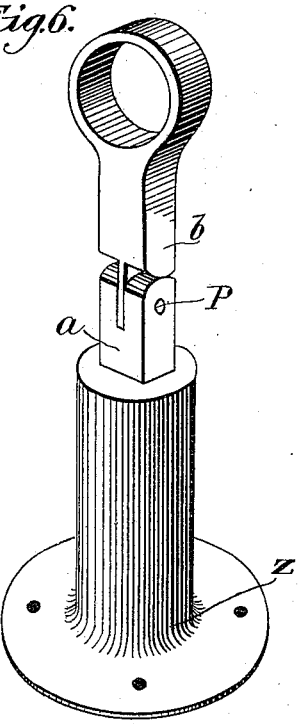
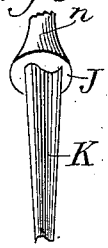
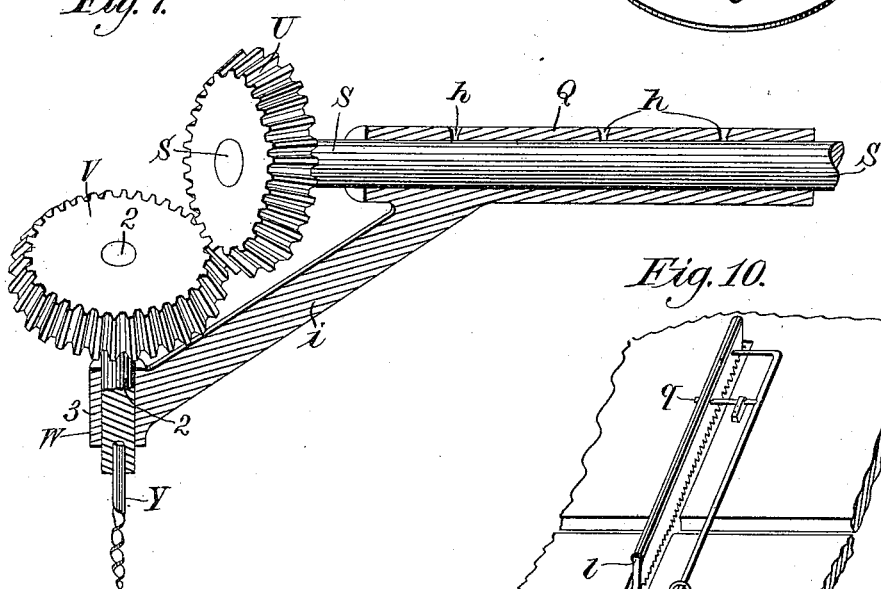
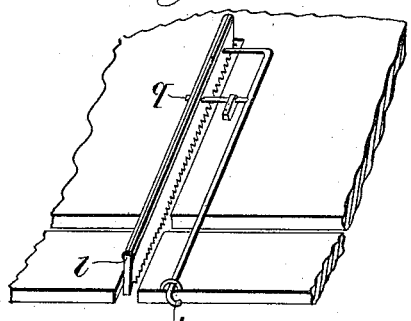
Witnesses:
Inventor:
Joseph T. Bright

UNITED STATES PATENT OFFICE.

JOSEPH T. BRIGHT, OF LEXINGTON, KENTUCKY.

COB-PIPE TURNING AND BORING LATHE.

SPECIFICATION forming part of Letters Patent No. 427,037, dated May 6, 1890.

Application filed November 11, 1889. Serial No. 329,955. (No model.)

*To all whom it may concern:*

Be it known that I, JOSEPH T. BRIGHT, of Lexington, in the county of Fayette and State of Kentucky, have invented a new and useful Improvement in Cob-Pipe Turning and Boring Lathes, of which the following is a description.

My invention is an improvement in cob-pipe turning and boring lathes; and it consists in certain novel constructions, combinations, and arrangements of parts, as will be first fully described, and then pointed out in the claims.

In the drawings, Figure 1 is a representation of my lathe. H, g, and k are band-wheels, to which the power is applied. G G is the boxing in which the hollow shaft A revolves. C is the rod, to which at one end the claws D D are pivoted, and at the other end of C is a screw-tap B. F is the holes in hollow shaft A, through which the claws pass. l is a saw, which is raised by the lever j. f f is the boxing, in which the hollow shaft I I revolves. The hollow shaft I I carries a bit-shaft n, Fig. 3, behind which is a coil-spring L. K is the cutting end of bit. J J is an enlarged portion of bit-shaft n, to prevent the cutting part of bit going into cob too far. M is a set-screw that screws into a groove t, Fig. 3. m is the support for shaft T T. N N is a double universal joint, which allows the movement of the revolving shaft S S at any desired angle. O is the ring through which the hollow cylinder Q passes. P Z is the support. U is a bevel cog-wheel, which is firmly fastened to the revolving shaft S S. h h are oiling-holes in the hollow cylinder Q. V is a cog-wheel, which matches and works in the cog-wheel U. W is the collar through which the shaft passes to receive the bit Y. i is a brace, which is attached to the hollow cylinder Q and collar W.

Fig. 2 is the shaft or rod, to one end of which is pivoted the claw-fingers D D for grasping the cob to be turned and bored. The other end carries a tap B, which, when screwed to the right, draws the rod C out of shaft A, Fig. 4, and closes the claws D D.

Fig. 3 is a hollow shaft, which carries a bit for boring a hole in the end of the cob. L is a coil-spring, which, by its pressure on the end of bit-shaft n, gently forces the bit K into the cob. M is a set-screw, which, being screwed down into the groove t of bit-shaft n, prevents the revolving of the bit-shaft n in the hollow shaft I. K is the cutting part of the bit. J J is the shoulder of bit-shaft n, which regulates the depth of the hole to be bored. t is the groove in the bit-shaft n, in which the end of set-screw M is placed.

Fig. 4 is the hollow shaft, which carries the rod C, Fig. 2. F F are the openings through which the claws D D pass. E is the hollow center in which the rod C, Fig. 2, works.

Fig. 5 is the double universal joint. T is the shaft which passes through band-wheel k in Fig. 1. S is the revolving shaft, which passes through the cylinder Q, Fig. 1. N is the pivot or cross of universal joint.

Fig. 6 is the support for the stem-hole-boring bit. b is attached to a by a pin P, thus making a movable joint, admitting of a free movement up and down of shaft S S, Fig. 1. Z is the base of the support.

Fig. 7 represents a portion of the stem-hole-boring attachment. S S is the revolving shaft, at one end of which is the universal joint, at the other end a cog-wheel U, which matches at right angles a cog-wheel V. S S passes through a cylinder Q with oil-holes h h. i is a brace, which is attached to the cylinder Q and collar W. 2 2 is the shaft, at one end of which is firmly attached the cog-wheel V and revolves in a cylinder-collar W, in the other end of which is a square hole to receive the bit Y, which bit bores the hole for the stem.

Fig. 8 is the bit for boring the hole in the end of the cob. n is the bit-shaft. J is the collar to prevent the bit from being forced too deeply into the cob.

Fig. 9 is an end view of the shaft n of the bit which bores the hole in the end of the cob. N is the shaft, as shown in position in Fig. 3. t is the groove into which the set-screw fits, as shown in Fig. 3.

Figure 1:
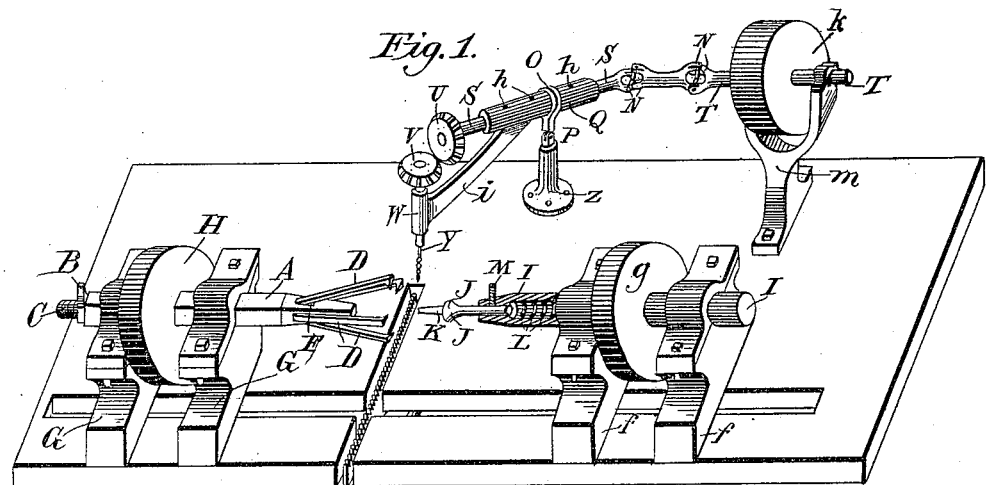
Figure 2:
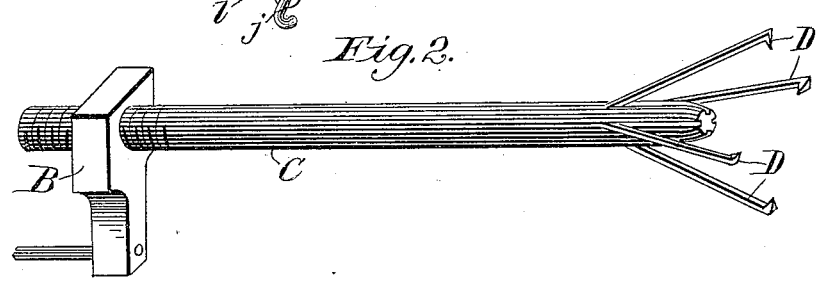
Figure 3:
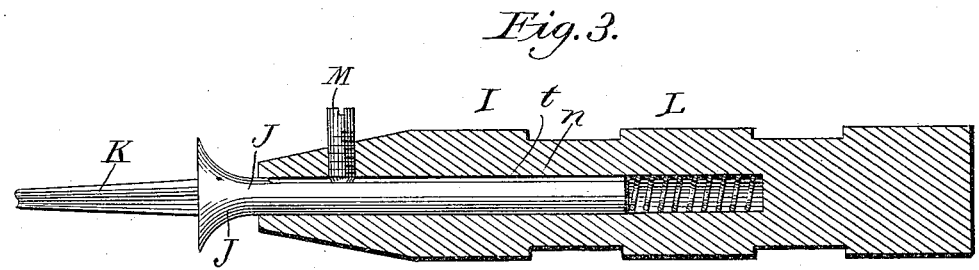
Figure 4:
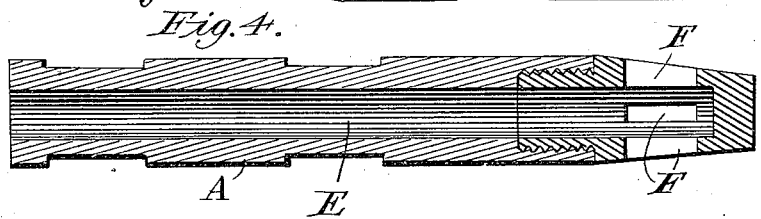

Fig. 10 represents the under side of table, showing the saw for cutting off the cob after the pipe has been bored for tobacco, stem turned and polished. j is a lever, which is pivoted to the end of the saw farthest from the front of the table. l is the saw. q is an axle, upon which the saw works. When the end of the lever is pulled out this distal end of the saw is lowered and the front end rises, thereby bringing it in contact with the cob, which is grasped in the claws D D, Fig. 2, and cuts it off.

Having thus described my invention, what I claim as new is—

1. A lathe comprising a revoluble tubular shaft having eyes at its end, a rod operating in said shaft, having claws pivoted in one end thereof, said claws operating through the eyes of said shaft, and a screw-tap at the other end to operate said claws, in combination with a spring boring-bit, a saw operated by a lever, and a stem-hole borer, substantially as shown and described.

2. The combination of a tubular shaft, a rod having claw-fingers pivoted thereto operating in said shaft, means for contracting and expanding said claw-fingers, a shaft carrying a spring-pressed boring-bit, a set-screw for holding said bit in the shaft and permitting longitudinal movement of the bit in the shaft, a revolving bit connected by universal double joints to a suitable source of power for boring the stem-hole, and a saw, all arranged and operating substantially as shown and described.

JOSEPH T. BRIGHT.

Witnesses:
J. E. McFARLAND,
FRANK GILMORE.